United States Patent
Goeckel et al.

(10) Patent No.: US 6,585,244 B2
(45) Date of Patent: Jul. 1, 2003

(54) WORK TABLE FOR SUPPORTING A WORKPIECE

(75) Inventors: Karl Goeckel, Malsch (DE); Martin Goeckel, Malsch (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 09/876,679

(22) Filed: Jun. 7, 2001

(65) Prior Publication Data

US 2002/0074704 A1 Jun. 20, 2002

(30) Foreign Application Priority Data

Jun. 14, 2000 (DE) .......................... 100 28 579

(51) Int. Cl.⁷ .............................................. B25B 11/00
(52) U.S. Cl. ....................................................... 269/21
(58) Field of Search ........................ 269/21, 289 R, 269/20; 294/64 R (56) References Cited

U.S. PATENT DOCUMENTS

| 4,024,809 | A | * | 5/1977 | Moehlenpah | 100/100 |
| 5,060,920 | A | * | 10/1991 | Engibarov | 269/282 |
| 5,427,363 | A | * | 6/1995 | Rink et al. | 269/21 |
| 5,433,657 | A | * | 7/1995 | Bovone | 451/388 |
| 5,499,802 | A | * | 3/1996 | Haberle | 269/99 |
| 5,573,230 | A | * | 11/1996 | Lambertini | 269/235 |
| 5,590,870 | A | * | 1/1997 | Goellner | 269/21 |

* cited by examiner

Primary Examiner—Lee D. Wilson
(74) Attorney, Agent, or Firm—Jordan and Hamburg LLP (57) ABSTRACT

A machine table for a processing machine for holding at least one workpiece to be processed or at least one work accessory includes at least one table element rotatably mounted and having at least two sides which can be brought into a working position by rotating the table element and on which the workpiece and/or work accessory can be held.

58 Claims, 4 Drawing Sheets

FIG. 9

WORK TABLE FOR SUPPORTING A WORKPIECE

BACKGROUND OF THE INVENTION

The invention relates to a machine table for a processing machine for holding at least one workpiece which is to be processed or at least one work accessory.

A workpiece of wood, for example, metal, plastic or glass can be fastened directly on such machine tables so that it can be worked by a processing machine, such as a router or the like. In addition, it is also possible to mount work accessories on the machine table, by means of which the workpiece, which is to be processed, is then held, or which, in turn, can be used to process the workpiece. For fastening the workpiece or a work accessory, suitable means are provided at the upper side of the machine table and interact with the workpiece or the work accessory, enabling the workpiece or work accessory to be clamped. Such means may comprise, for example, a groove-grid structure which is produced in the table surface and is connected with a source of vacuum so that a vacuum can be brought into the structure. By means of sealing cords inserted in the grooves, a bounded vacuum space can thus be created on which the workpiece is placed and thus held by suction. Instead of a groove grid structure, it is also possible to provide vacuum channels which discharge at the upper side and are also connected to a source of vacuum and can be sealed by suitable sealing elements. If a workpiece or a work accessory is to be clamped, the necessary openings are simply opened, so that the vacuum can be applied to the workpiece or work accessory. Moreover, magnetic surfaces are also known on which work accessories which have a metallic holding section can be placed and held. These are only some of the known clamping techniques which can be used in order to be able to hold workpieces or work accessories on a machine table. The list is not complete and other, appropriate clamping techniques are, of course known to those skilled in the art.

Each machine table is designed for a particular clamping technique, that is, the worker can use only one clamping technique at the table assigned to a processing machine. Consequently, when there is a change in the workpieces which are to be processed, for example, within the scope of a series production process, a device of the machine table, which is selected for workpiece A and on which, for example, appropriate work accessories in the form of vacuum suction elements are set down, which in their arrangement are placed in accordance with the shape of the workpiece A, must be changed in order to set up the table in accordance with the shape and the requirements of the workpiece B, which is to be processed subsequently. This is expensive and time consuming.

SUMMARY OF THE INVENTION

It is an object of the invention to provide a machine table which can be used more flexibly and variably.

Pursuant to the invention, this object is accomplished by a machine table having at least one table element which is mounted so that it can rotate about an axis and has at least two sides which can be brought into a working position by rotating the table element and at which the workpiece and/or the work accessory can be held.

The rotatability of the table element, which has at least two working sides at each of which a workpiece or a work accessory can be fastened, makes variable and very flexible working possible. At each side of the table, appropriate means for holding the workpiece or the work accessory, no matter of what type, are provided. Similar or different operating holding means can be provided at the respective sides. For the worker, there is the appreciable advantage that, for example, he can set up the first side of the table in accordance with a workpiece A having a first shape and the second or any additional side in accordance with the requirements of a further workpiece B, C, etc. which is to be processed. In the event that there is a change in workpieces, he need only rotate the table element so that the respectively set up working side faces upward. If, for example, in the case of a table element with two working sides, similar holding means in the form of a groove-grid structure, over which a vacuum can be applied to the workpiece, are provided on either side, then it is possible to use the sealing cord at a first side in accordance with the shape of workpiece A and to close off the vacuum channel openings which open up outside of the area surrounded by the sealing cords. At the opposite side, the sealing cord or cords can be placed in accordance with the shape of a workpiece B. In the event that there is a change in workpieces, an immediate change in the table side is possible, without having to undertake any other devices.

On the other hand, if different clamping techniques or different clamping means are realized at the sides, it is possible to clamp a workpiece A at the first side. If subsequently workpiece B is to be clamped and cannot be held with the clamping technique provided at the first side, the table element can be rotated and the second side with the other type of clamping technique, at which or by means of which the other workpiece B can be clamped, can be rotated to the top. Of course, the same applies also to mounting a work accessory. In this case, the machine table can be used for numerous functions by the worker in view of the possibility of clamping different types of workpieces with one and the same machine table using different clamping techniques or different holding means, and of processing these workpieces with one and the same processing machine. In the past, different combinations of machine tables and processing machines have always been required for this purpose, since the inventive variability of the clamping technique at one machine table did not exist.

Overall, the machine table in accordance with the invention offers the worker the possibility of working extremely rapidly and variably.

According to a first embodiment of the invention, the table element can be constructed as a tabletop with a large surface. In this embodiment, only one table element which is held at an appropriate table frame is used. It can be swiveled about an axis which, in the case of a conventional, rectangular construction of the tabletop, preferable extends in the longitudinal direction of the tabletop.

On the other hand, in embodiment of the invention, the table element is constructed in the form of a console, several console-like table elements, which are disposed parallel to one another, being provided at a table frame. In this embodiment of the invention, the table or clamping plane is formed by means of several table elements, which in each case have several sides which can be brought into an appropriate working position. A workpiece can be clamped at only one table element or, overlapping two or more table elements, clamped to these, either directly or with the insertion of appropriate work accessories, such as a vacuum suction apparatus or the like. Since each table element is mounted so that it can be rotated, turning in this way does not require much space and, at the same time, the possibility exists of forming very large table planes.

Moreover, each console-like table element can be essentially triangular at cross section and have three sides, at which appropriate holding means can be provided. In this manner, the worker can chose between three working sides. As an alternative to the triangular construction, each table element can be constructed essentially with a quadrilateral cross section and thus have four sides. Table elements with more than four sides are also conceivable.

Biangular, triangular or quadrilateral table elements are advantageous especially if, as can be provided pursuant to the invention, the console-like table elements are mounted displaceably at the table frame. The displaceable mounting offers the possibility that each table element can be positioned anywhere close to another table element, in order to be able, without any problems, to clamp also smaller workpieces which must be clamped using two table elements which are disposed next to one another. In addition, the possibility exists when using table elements with two sides, which then are essentially flat and rectangular, when using triangular table elements and when using quadrilateral table elements, to arrange these table elements so that they adjoin one another directly and form a closed table surface on which the workpiece can lie completely. The table elements themselves can be manually displaceable; additionally or alternatively, automatic displaceability may also be realized. For the automatic displacement, motorized or pneumatic driving mechanisms advisably are used. The automatic displacement advisably is controlled by a central control device. The table elements can be locked in the respective positions by suitable locking or fixing mechanisms. A shifting mechanism, which can be used, is described, for example, in German patent application No. DE 100 23 916, to which reference is explicitly made and the disclosure content of which is incorporated into the present application.

The turning of the table element or elements can also take place manually and/or automatically and appropriate motorized or pneumatic driving mechanisms can be provided, which are controlled over a common central control device. In the respective end position, the table elements are locked by suitable locking or fixing means. Moreover, several table elements can be rotated jointly by means of a joint motorized or pneumatic driving mechanism. Alternatively, the individual table elements can also be rotated separated by means of their own driving mechanism assigned to each table element.

As described above, similar or different acting means which engage the workpiece or the work accessory or interact with these can be provided at the sides for holding the workpiece and/or the work accessory. If more than two sides are provided at the respective table elements, that is, in the case of a triangular, quadrilateral or multilateral construction, it is, of course, possible to provide similar acting holding means at two or more sides and different acting holding means at the other sides, the concrete construction or distribution being immaterial here.

Moreover, the acting or holding means can be constructed directly at the respective side or be integrated there, that is, the means are permanently mounted at the respective side. However, to make the greatest possible flexibility feasible with respect to the means provided at a table element, it has proven to be particularly advantageous if at least one attachable element having or forming the respective means is or can be fastened at the respective side. In accordance with this embodiment of the invention, each table element is constructed in modular fashion inasmuch as it includes a basic support. One or more two-dimensional attachable elements can be fastened to the sides of the basic support. These attachable elements have or form the respective holding means, that is, with each attachable element, a specific clamping technique is realized or arranged at the basic support. This makes it possible, if necessary, to provide a desired clamping technique, which is not yet present at the respective table element, subsequently there, in exchange for a different one, for which purpose it is merely necessary to exchange attachable elements. With that, the machine table is even more variable and can be used even more flexibly by the worker.

Moreover, the acting or holding means of a first embodiment of the invention may comprise a grid-groove structure over which a vacuum is applied to the attached workpiece or work accessory. The grid-groove structure can be milled directly into the respective side of the table element or, alternatively, formed by a two-dimensional attachable element which in turn is fastened and preferably bolted to the support of the table element. A further embodiment of the holding means is in the form of a groove structure, especially a T-shaped groove structure, which interacts with corresponding counterpieces which can be introduced into the groove structure and are formed at the workpiece or work accessory for holding the workpiece. These preferably T-shaped grooves can be produced directly on the surface of the table element; alternatively, they may be formed in a holding plate. Work accessories, for example, in the form of separate clamping claws, a tailstock, a stop or the like are preferably held or clamped to such a holding structure. If such a structure is provided at a quadrilateral supporting element at right angles to a structure and clamping a workpiece by vacuum, then the vacuum clamping structure can be brought, for example, into the horizontal working position and appropriate stops can be fastened to the T-shaped groove structure, which extends perpendicularly thereto.

In another embodiment of the invention, the acting or holding means may comprise longitudinally extending rails on which at least one carriage carrying the workpiece or the work accessory can be shifted and locked. This carriage may, for example, carry a holding platform for a work accessory, such as vacuum clamping sleeves, which can be fastened, on the one hand, by vacuum to the flat holding platform and, on the other, clamp a workpiece at the top by vacuum. Vacuum clamping means, which can be used for this purpose, are described, for example, in German patent application No. DE 197 50 656, to which reference is explicitly made and the disclosure content of which is incorporated into the application. If the table element has a modular construction, then the rails are provided at an appropriate holding plate on which the carriage or carriages can then be placed.

In another embodiment relating to the holding means, the holding means may comprise a plurality of suction openings which can be closed off by valve elements and over which a vacuum can be applied to the workpiece or the work accessory which has been set down. These suction openings with the integrated valve elements can also be provided directly at the table element or at a suitable holding plate. An example of an embodiment of such a holding device is described, for example, in German patent application No. DE 100 23 323, to which reference is explicitly made and the disclosure content of which is incorporated into this application. Aside from the mechanical valve elements, described in this application, electrically operated valves can also be used which are controlled over a central control device. It is important here to ensure that the leads connecting the control device and the electrically operated valves cannot be sheared off when the table element is rotated.

Finally, according to another alternative of the holding means, the holding means comprise a magnetizable plate, especially a plate, which can be magnetized by electromagnets. Appropriate work accessories and, of course, also workpieces, which are to be processed and have an appropriate metal insert or the like, can also be held at the plate by these means.

In another embodiment of the invention, the holding means comprise a metal plate with a plurality of channel openings discharging into the top with assigned magnetic closing disks. A vacuum can be applied over the channel openings to the workpiece or work accessory. In this manner, the channel openings are closed by the closing disk and, if necessary, opened so that the worker can form any suction configuration simply by taking away the closing disks or setting them down.

In accordance with another embodiment of the invention, the holding means comprise a panel of wood or plastic, into which nails, screws or other elements can be introduced.

The respective attachable element is panel-shaped in order to realize the largest possible surface for accommodating the workpiece or work accessory along the table element. Each attachable element is fastened by suitable fastening means to the respective side of the table element, for which purpose fastening screws are preferably used and are screwed into corresponding threaded seats at the basic support. Each holding element forms an adaptor for a particular fastening or clamping technique.

For supplying the vacuum to the respective holding means which require a vacuum force, at least one vacuum channel is preferably provided within the table element. The means by which vacuum is supplied to the workpiece or work accessory can be supplied through this vacuum channel to which an external source of vacuum is connected. The channel itself is conducted so that appropriate openings are provided wherever vacuum is to be delivered to the workpiece. If the table element has a modular construction, it is preferable that several channel boreholes which communicate with the integrated vacuum channel and of which at least a portion can be connected with corresponding channel boreholes of the respective attachable elements, discharge at the respective side. The channel boreholes are arranged such that when a panel-shaped holding element is placed down, they are connected automatically with corresponding boreholes formed there in order to transfer the vacuum to the attachable element. In order to be able to couple the attachable element satisfactorily to the basic support of the channel boreholes provided at the basic support of the table, a corresponding channel network including a plurality of channel grooves may also be provided at the underside of the attachable element. If such a groove coincides with a corresponding channel borehole on the support, the entire channel network is automatically acted upon by vacuum. If an attachable element with a holding technique, which does not work with vacuum, is set down, the channel boreholes, which are provided in the support are simply sealed from the underside of the attachable element. Instead of a network of channels, a large vacuum cavity may also be provided at the underside of each attachable element. This means that the underside of the attachable element is somewhat removed from the upper side of the basic support. However, the edge of the attachable element itself is seated completely tight on the support.

Preferably, underneath each side of the table element, at least one vacuum channel is provided which discharges over channel boreholes at the respective side in order to create the possibility of mounting an attachable plate with vacuum holding means on any side.

According to a particularly advantageous embodiment of the invention, a vacuum channel assigned to one side can be connected with an external source of vacuum only in and automatically upon reaching the position in which the respective side is in its working position. If, in accordance with this embodiment, a side is rotated into its work position, the coupling of a vacuum channel assigned to the side with an external source of vacuum is realized automatically.

Furthermore, pursuant to the invention, one or more locking elements may be provided for locking the table element in the respective position. Locking bolts may be used which are controlled mechanically or electrically and engage corresponding locking recesses.

In view of the previously described automatic coupling of a vacuum channel with an external source of vacuum, it is particularly appropriate if at least one locking element is constructed simultaneously as a connecting element between the vacuum channel and the vacuum source, which can be connected to the locking element. Pursuant to this embodiment of the invention, an appropriately constructed locking element engages a vacuum channel when it snaps into the locking position and, at the same time, connects the vacuum channel with the source of vacuum. This locking element therefore has a locking as well as a channel-connecting function.

Since different work accessories are operated by compressed air, it is appropriate to provide at least one compressed air channel which can be connected with an external source of compressed air and is integrated in the table element and discharges at least at one side. This compressed air channel can also be tapped if the side at which it emerges is not in the upper working position. In this manner, the compressed air is supplied over a compressed air hose which can be connected to the work accessory, such as a clamping jaw which is fastened to the side in the working position.

A plate is preferably arranged at one side of the table element. Suitable means for connecting a vacuum channel or a compressed air channel the respective source and/or a locking element are provided at the plate and close off the vacuum channel or channels and optionally the compressed air channel or channels. The table element or a basic support itself is pressed preferably in the form of an extruded profile and consequently is open at both sides, where the basic support is closed off over appropriate closing plates and the corresponding channels are sealed preferably, all necessary connections are provided at this plate.

According to a further embodiment of the invention, each console-like table element includes several table element sections which are arranged in series and in each case have at least two sides which can be rotated separately about a common axis and can be mutually locked. The table element sections, which can be rotated and locked separately, can in turn carry any different clamping techniques at the respective sides, so that, within a table element plane, different clamping techniques at the different positions along the table element can be rotated into the working position so that the flexibility is increased even further. The table element sections can be rotated manually and/or mechanically. Locking is achieved with appropriate locking couplings, that is, the sections mutually interlock when they are in the appropriate end position, in which the respective sides of the sections extend parallel to one another.

In this embodiment, each table element section should have at least one vacuum channel and/or at least one compressed air channel. It should be possible to couple at least the channels of two adjacent table element sections which are in the upper working position with one another so that all operating means can be in communication with one another also between the table element sections over a central connection, as described above. Even though it is sufficient that in each case the channels in the sides in the working position can be coupled with one another, it is preferable that the channels of two adjacent table element sections which extend in the region of a side, not in the upper working position, can be coupled with one another in order to tap, for example, the compressed air from a side which is not rotated to the top and to supply it to a work accessory fastened at the upper side.

In view of providing a coupling of the channels which is as simple as possible, it is preferable if this coupling takes place automatically upon reaching a position in which the sides of two table element sections lie parallel to one another. This can be accomplished over suitable locking couplings, which enable the respective channels to be connected appropriately.

In additional embodiments of the invention, at least one table element section can be removed from the construction so that a modular system is realized in which the individual table element sections can be used alternately or removed. Moreover, the table element sections can be placed in a detachable manner on a central support extending in the axis of rotation and held there, for example, by screws, by being inserted or clamped or by a magnetic force. After the respective section is fastened, it can be rotated along by driving the support.

On the other hand, in another embodiment of the invention, each table element section can be removed completely from the construction so that there is a gap between two table element sections into which a third object can be inserted. In this embodiment of the invention, a third object, such as a workpiece to be processed, can be clamped between two table element sections and rotated so that it is possible to process the workpiece by turning, shaping, etc. The workpiece is delivered over one of the outer table elements while the table element at the other end forms the opposite side.

Further advantages, distinguishing features and details of the invention arise out of the examples, which are described in the following, and from the accompanying drawings.

DESCRIPTION OF THE PREFERRED EMBODIMENTS

Figure 1:
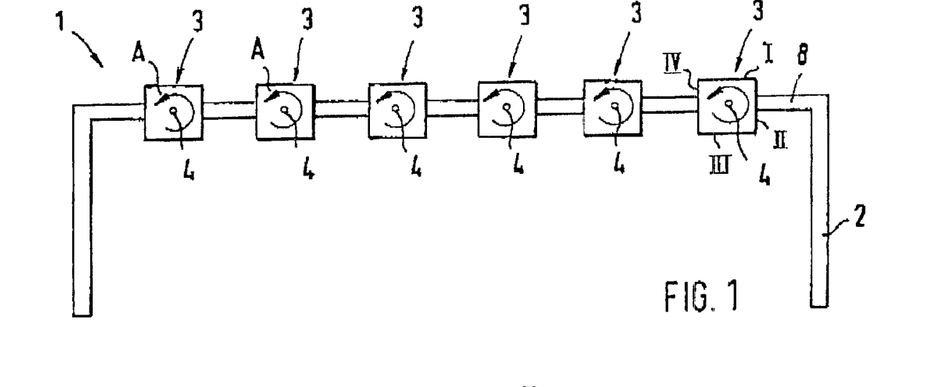
FIG. 1 is a diagrammatic sketch of a first embodiment of a machine table in accordance with the invention.

FIG. 1 shows a first embodiment of a machine table 1 in accordance with the invention. The machine table 1 includes a machine frame 2 to which several table elements 3 are fastened. As shown in FIG. 1 and indicated by the respective arrow A, these table elements are mounted so that they can be rotated about the respective axis of rotation 4. For rotating the table elements 3, which are mounted at the table frame 2 so that they can be rotated over suitable axle journals 5, appropriate motors 6 are connected over appropriate connecting leads with a central control device 7. Each table element has four sides I, II, III, IV, at which there are appropriate holding means for holding a workpiece installation and/or work accessories. This will be discussed in greater detail in connection with FIGS. 5 and 7.

By means of the motors 6, it is possible to turn each table element 3 such that any side I to IV can be at the top and form the table surface.

Figure 2:
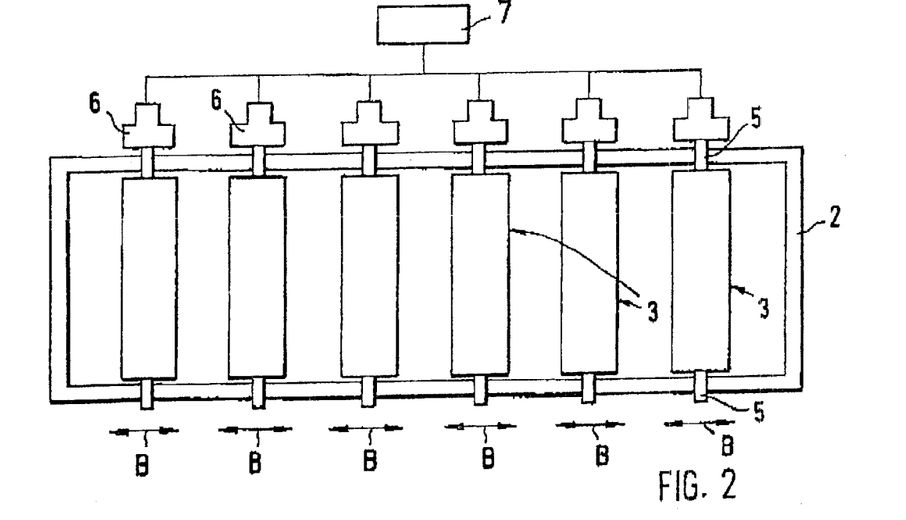
FIG. 2 is a plan view of the table of FIG. 1 as a diagrammatic sketch.

Moreover, all table elements 3 can be shifted along a horizontal support 8 of the table frame 2, as indicated by the arrows B in the FIG. 2. The horizontal displacement also is preferably accomplished automatically by the control unit 7. For this purpose, a displacement technique, such as that in described in German patent application No. DE 100 23 916, may be used, for example. This enables the table elements 3 to be as close to one another or as distant from one another as desired in order to form any configuration of the upper side of the table.

Figure 3:
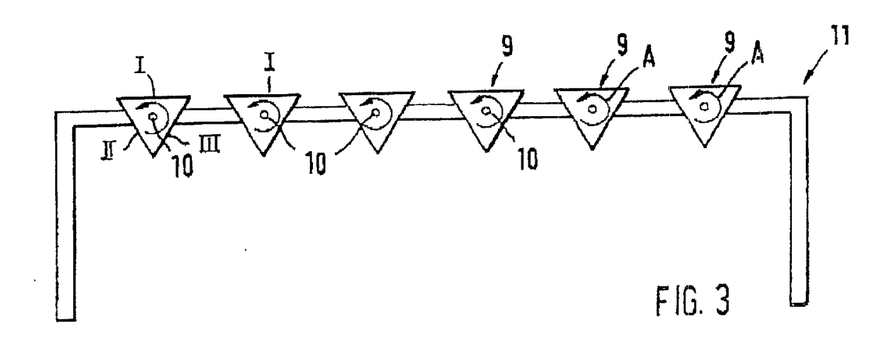
FIG. 3 is a diagrammatic sketch of a second embodiment of a machine table in accordance with the invention.

It is evident that the quadrilateral construction of the table elements 3, shown in FIGS. 1 and 2, enables the table elements 3 to be positioned in direct contact with one another so that a closed upper side of the table 1 can be formed. The same arrangement is also possible with table elements 9 having a triangular cross section of the machine table 11 shown in FIG. 3. Table elements 9 can also be rotated about the respective axes of rotation 10, as indicated by arrows A. The table elements 9, shown in FIG. 3, have three sides I, II, I, at which appropriate holding means are provided. In view of the triangular configuration, the table elements 9 can be rotated jointly about the respective axis 10, even if they are disposed immediately adjacent to one another.

Figure 4:
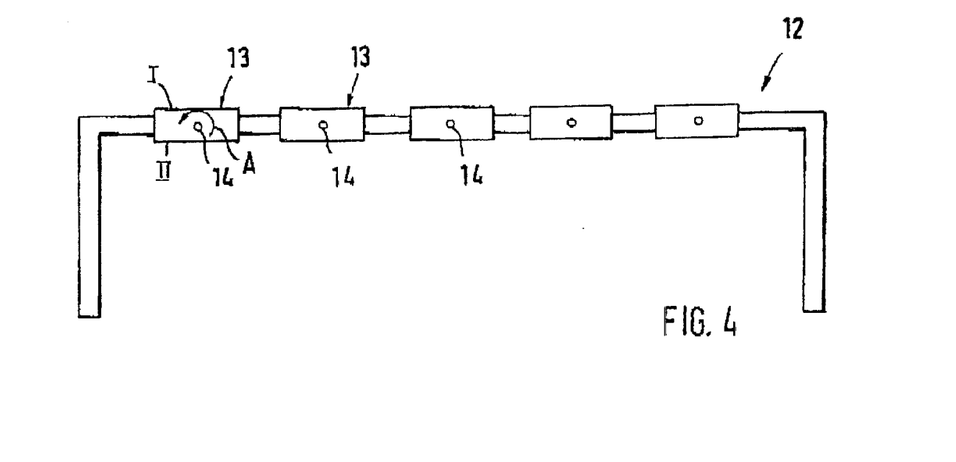
FIG. 4 is a diagrammatic sketch of a third embodiment of a machine table in accordance with the invention.

FIG. 4 shows another embodiment of a machine table 12, for which the table elements 13 essentially have a flat, rectangular configuration and any two sides I, II, at which appropriate holding means are provided. These table elements 13 can also be rotated about appropriate axes of rotation 14. In this machine table 12, as also the machine table 11 of FIG. 3, appropriate motors are used for the rotation of the table elements and horizontal displacement of the table elements is also possible.

Figure 5:
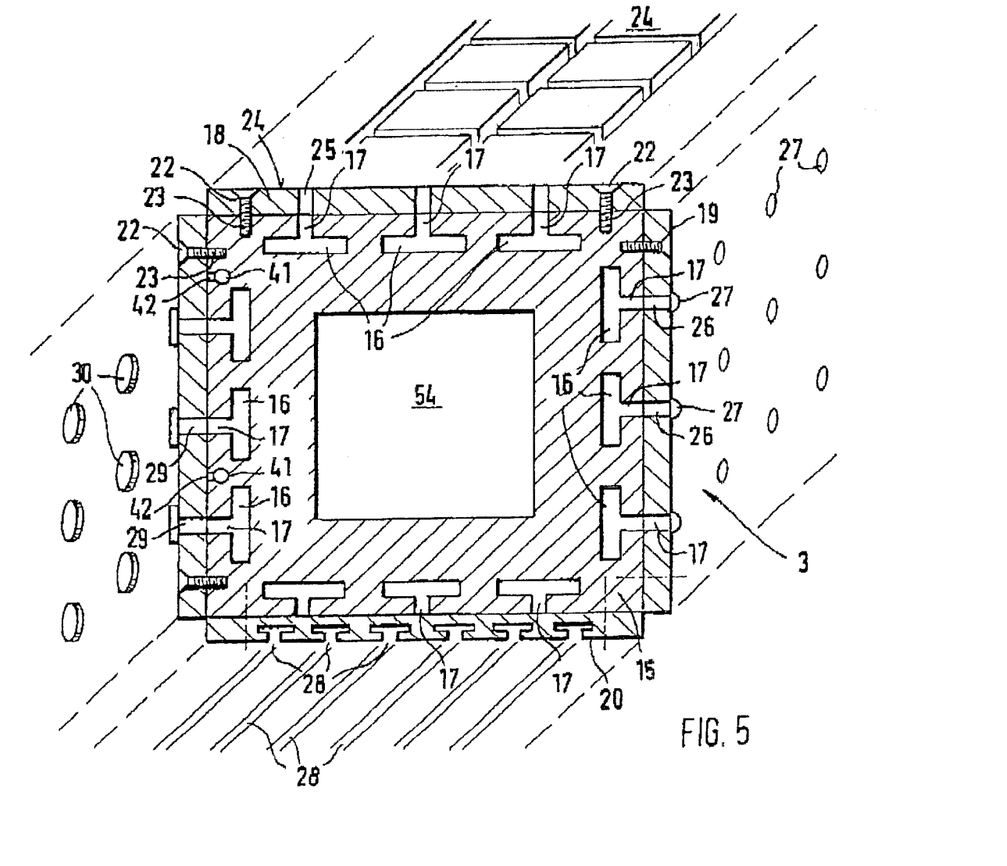
FIG. 5 is a diagrammatic sketch as a sectional view of a table element with a quadrilateral cross section.

FIG. 5 shows a section through a quadrilateral table element 3. This table element 3 includes a basic support 15. Several vacuum channels 16 extend from one end of the support 15 to the other and are assigned to each longitudinal side of the basic support 15. The vacuum channels 16 discharge over channel boreholes 17 at the respective side. Appropriate views of the upper sides of the respective holding plates are also shown as diagrammatic representations in FIG. 5.

On each side of the basic support 15, a plate-shaped attachable element 18, 19, 20, 21 is set down by means of suitable fastening screws 22 which engage corresponding threaded boreholes 23 at the respective side of the basic support 15. In the example shown, each attachable element 18-21 has different means for holding a workpiece/work accessory. At the upper side of the attachable element 18, a grid-groove structure 24 is milled, this groove or channel structure being formed by appropriate channel boreholes 25 which are connected with corresponding channel boreholes 17 of the vacuum channels 16 when the attachable element is set down. The upper partial representation, shown by broken lines, indicates a plan view of the grid-groove structure 24 as well as the channel boreholes 25 which enable communication with a vacuum supplied over the vacuum channels 16 on the grid-groove structure 24. By using the sealing cords, the details of which are not shown and which are placed into the appropriate grooves, it is possible to form defined suction sections, to which a two-dimensional workpiece can be fastened.

At the right side of the basic support 15, perpendicularly thereto, a panelshaped attachable element 19 is bolted also by means of suitable fastening screws 22. At the basic support 15, a series of channel boreholes 26 have also been provided which, after the attachable element 19 is set down, are connected in the same manner with the channel boreholes 17 of the vacuum channels 16. At or in the region of the upper side of the attachable element 19, channel boreholes 28 are closed off over suitable valve elements 27 (for example, of the type described in German patent application No. DE 100 23 323). If a workpiece or an attachable element is a placed on the surface, at least one valve element 27 is actuated so that the vacuum channel 16 is opened and the vacuum can be taken to the workpiece/work accessory. When not actuated, the valve elements 27 are closed.

At the underside of the basic support 15, an attachable element 20 is fastened by means of suitable fastening screws 22. The attachable element 20 includes several T-shaped grooves 28 which extend in the longitudinal direction of the table element 3. Corresponding T-shaped counterpieces, which are provided at a work accessory in the form of a clamping jaw or the like, can be introduced into the T-shaped grooves 28. By means of the T-shaped counterpieces, the work accessory can be appropriately clamped in the grooves 28.

A fourth attachable element 21 in the form of a metal plate is screwed with fastening screws 22 detachably to the fourth, left side of the basic support 15. The metal plate also has several channel boreholes 29 which, in the set-down state, are connected with the channel boreholes 17 of the respective vacuum channels 16. The channel boreholes 29, ending at the upper side of the metal plate 21, are closed off there over appropriate magnetic closing disks 30. If a workpiece is to be clamped by means of vacuum, either directly to the upper side of the metal plate 21 or with the interposition of a vacuum suction element between the metal plate 21 and the workpiece, the closing disks 30 required for the clamping are removed so that the openings are freed.

In view of the foregoing, the table element 3 thus has a modular construction in that it includes the standardized basic support 15, which has appropriate vacuum channels on all sides and appropriate channel boreholes discharging laterally, and has the modular holding plates. Each attachable element 18–21 has means for a different clamping technique so that a person working at the machine can select the clamping technique suitable for clamping the workpiece. In addition, because of the modular construction, it is also possible, if necessary, to remove one or more of the attachable elements and replace it with a different one, so that the greatest possible variability exists. The side, desired depending on the requirements, is rotated to be at the top, as shown in FIGS. 1 and 2. The same applies with respect to the machine tables shown in FIGS. 3 and 4.

It should be noted that, instead of the separate channel boreholes within the attachable elements 18–21, a corresponding channel network in which the vacuum is introduced over one or several channel boreholes 17 is also provided at the respective underside of an attachable element. The formation of a large cavity is also conceivable, in which case each attachable element would be seated only at the edge and tightly on the respective side of the basic support 15. Every possibility is conceivable here, which enables the vacuum to be supplied to over vacuum channels 16 to the corresponding attachable element. It is a question here of an attachable element, the holding means of which do not work with vacuum, so that, as in the case of the attachable element 20, the underside is closed and lies tightly on the channel boreholes 17.

Figure 6:
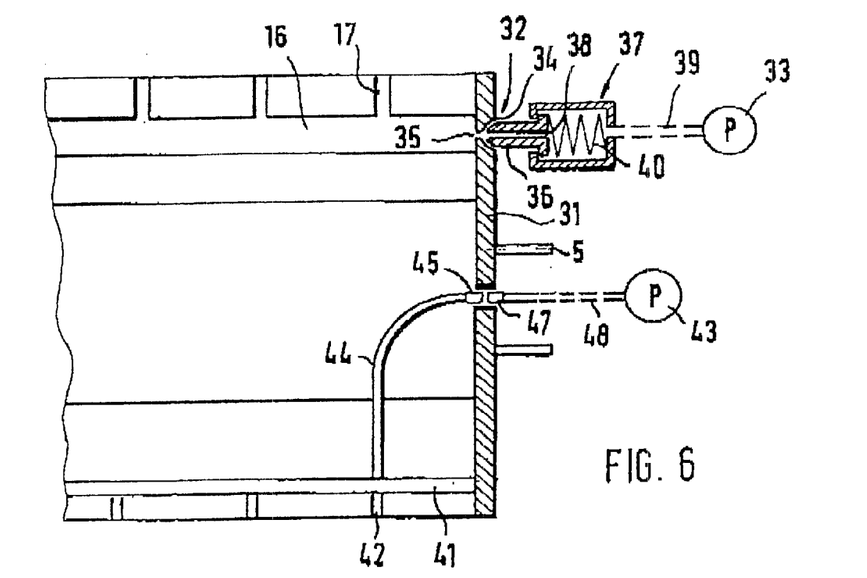
FIG. 6 is a diagrammatic sketch in section of the table element of FIG. for illustrating the connection of the respective channels with corresponding sources of supply.

This is important in order to ensure that the vacuum system is closed when a vacuum is not required. As shown in FIG. 6, the machine table in accordance with the invention is provided with an automatic coupling mechanism for connecting the vacuum channel or channels 16 assigned to the respective side in the working position with a source of vacuum. As shown in FIG. 6, the front side is closed off tightly with a closing plate 31 (the corresponding applies for the opposite side, which is closed off and sealed over the plate 34, see FIG. 5). At plate 31, appropriate connecting means 32 are provided, over which a vacuum channel 16 can be connected automatically with a vacuum source 33. The connecting means 32 comprise a recess 34 which is hemispherical in the example shown and discharges into a vacuum channel 16. It should be pointed out that, of course, all vacuum channels 16, which are assigned to a side, preferably are connected with one another so that only one connecting site has to be provided for the source of vacuum 33.

A latching element 36 of a locking element 37, over which the locking of the table element 3 in the working position is assured, is latched in the recess 34. The vacuum source 33 is also coupled automatically over the latching element 36. For this purpose, the latching element 36 has an opening 38 through which the vacuum, effected over a suitable connecting pipeline 39, can be passed on to the latching element 38 which is mounted over a compression spring 40. If the latching element 36 is latched in the recess 34, the corresponding vacuum channel 16 is connected automatically with the vacuum source 33. If the table element is turned further, the latching element 36 is pressed out of the recess 34, as a result of which a corresponding mechanism can be initiated, so that the latching element 36, representing a valve element is closed and the vacuum cycle is closed. Only by latching into the next recess, which is allocated to the neighboring side, is this vacuum cycle opened again. In the event that an attachable element is screwed on, which has holding means that do not work with a vacuum, the channel boreholes 17 are closed off by the underside of the attachable element so that, in spite of the latching engagement, the vacuum cycle is closed also in this case.

FIG. 6 also shows the possibility of connecting a compressed air channel 41 which is at a different side (in FIG. 5, two such compressed air channels 41 are provided which discharged over the appropriate channel boreholes 42 at the respective side of the basic support 15) with an external and compressed air source 43. In the interior of the hollow basic support 15, a compressed air pipeline 44 is provided which extends from a connecting part 45 lying in the axis of rotation to a corresponding connection at the compressed air channel 41. The source of compressed air 43 is coupled over appropriate connecting means 47 and over a compressed air hose 48. By means of the connecting means 45, 47, a rotatable connection is realized which enables the table element to be rotated in any way without disconnecting the connection to the compressed air source 43. This means that the internal, compressed air pipeline 44 turns, while the external, compressed air pipeline 48 remains stationary.

Figure 7:
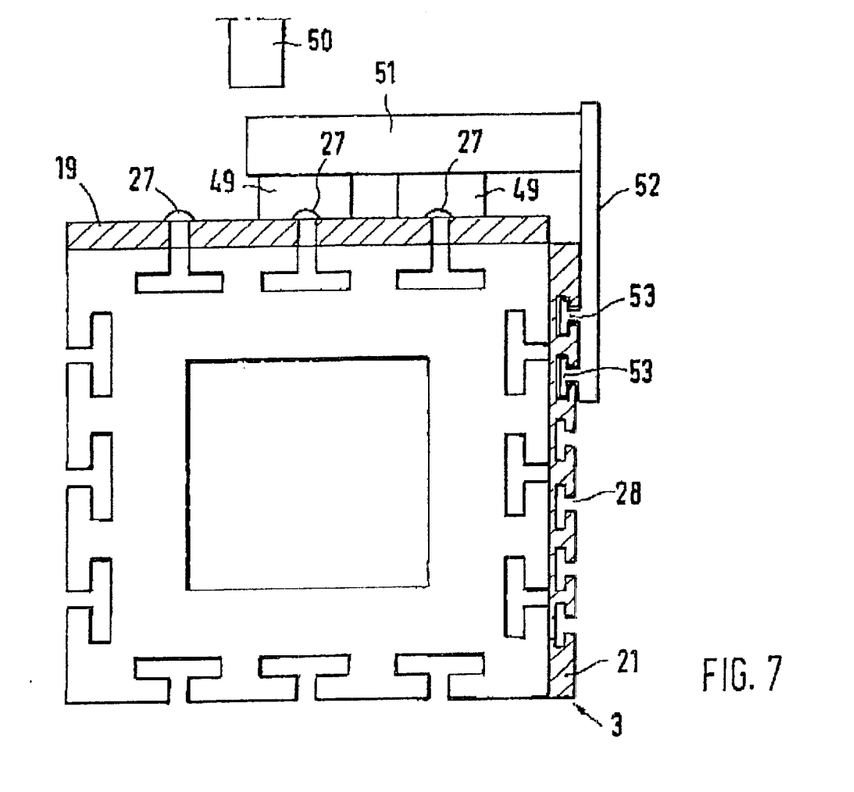
FIG. 7 is a diagrammatic representation of a table element, to which work accessories and a workpiece are attached.

FIG. 7 shows an example of a possible use of a table element 3 of a machine table in accordance with the invention. An attachable element 19 with a valve element 27 at the upper side is bolted to the upper side of the attachable element 3 and a valve element 21 with T-shaped grooves 28 is bolted to the right side of the attachable element 3. The two other sides are not occupied by attachable elements. In the example shown, two vacuum suction elements 49, the undersides of which operate in each case one valve element 27 so that the connection to the respective vacuum channel 16 is opened, are placed upon the attachable element 27. A workpiece 51, which is to be worked by means of a tool 50, is placed upon on the vacuum suction elements 49 and clamped by the vacuum.

A stop 52 is fastened to the attachable element 21 and a corresponding T-shaped counterpiece 53 is formed at one side of the stop 52. The counterpieces 53 engage two T-shaped grooves 28 and, after the stop 52 is positioned, are clamped there over the length of the table element 3. The workpiece 51 can be pushed against the stop 52 so that it can be positioned for processing purposes. In this manner, the collaboration of the different clamping techniques is demonstrated.

Figure 8:
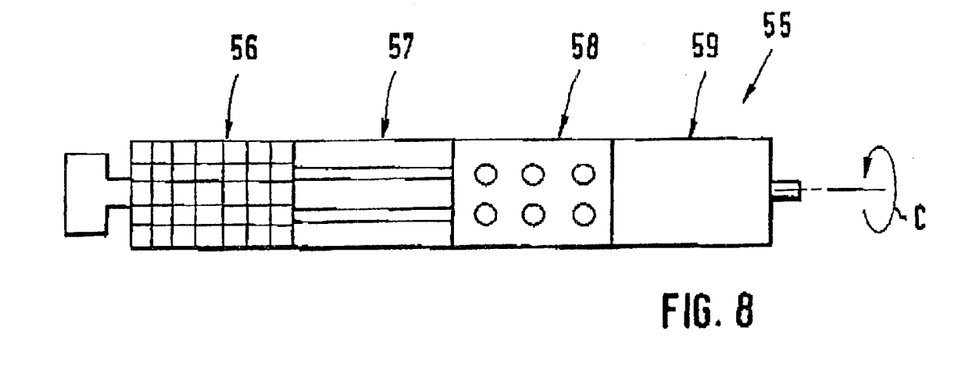
FIG. 8 is a diagrammatic representation of a table element including several table element sections.

FIG. 8 shows a diagrammatic representation of a table 55 which may be part of one of the machine modifications shown in FIGS. 1–4. This table element 55 includes four table element sections, 56, 57, 58, 59, all of which can be rotated separately about the common axis (see arrow C). Each of the table element sections 56–59 has an appropriate number of sides, at which different clamping techniques are provided. The construction of a table element preferably corresponds to that of the embodiment previously described. This construction with the separately rotatable table element sections makes it possible to rotate different clamping techniques in one working plane. In the example shown, different clamping techniques are shown within the limitations of the sketch on each table element section 56–59, a grid-groove structure on section 56, a T-shaped groove structure on section 57, a magnetic plate with removable covering lids on section 58 and a level wood or plastic surface, into which nails, for example, can be driven on section 59. These can be realized, for example, by means of suitable holding plates on a basic support section of a table element section, which is not shown.

The table element sections can be rotated separately by a common driving mechanism. Alternatively, there is of course also the possibility of rotating the individual sections only manually. The vacuum and/or compressed air channels, which extend in each of the sections 56–59 are connected to one another so that when the right section 59, for example, is connected to a vacuum source, the vacuum automatically extends through all sections 56–59. The corresponding applies to the compressed air channel or channels. Preferably, the configuration is as described with respect to FIG. 6, according to which only the vacuum channels in the upper working position can be coupled with the vacuum source. For communicating between the individual sections, there is a corresponding channel coupling as described also in connection with FIG. 6. Of course, someone skilled in the art has free choice here, as long as it is ensured that the channels, upon reaching a position in which the sides of two adjacent sections extending parallel to one another, are automatically coupled together.

Figure 9:
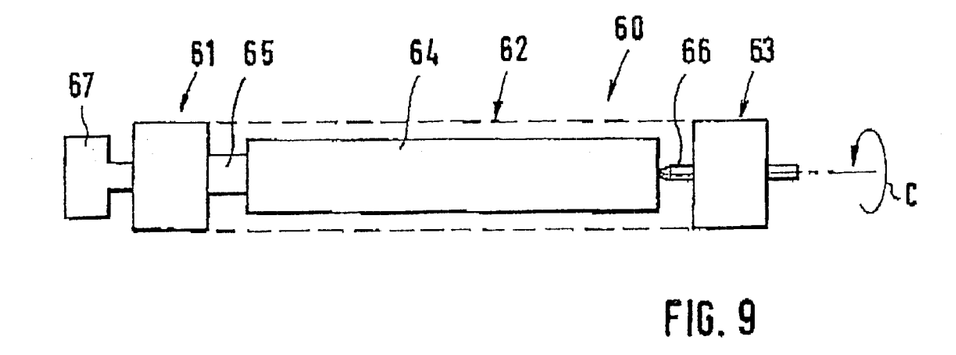
FIG. 9 is a diagrammatic representation of a modular table element of a further embodiment of a machine table in accordance with the invention.

FIG. 9 shows another table element 60 which may be part of a machine table of FIGS. 1–4 and which also includes three table sections 61, 62, 63. However, the table elements 62 can be taken out of the construction here and, in the present case, is drawn only by broken lines. Between the two sections 61 and 63, a workpiece 64 is clamped, which is held at the left side by an appropriate holding or slaving section 65 and at the right side on a mandrel 66. This workpiece 64 is rotated by the driving mechanism 67, so that it can be processed, for example, by shaping or turning.

It should be noted that the examples shown are in no way limiting. Rather, any other attachable elements can be set down, which also have clamping techniques or holding means and are not described in the Figures, but are known to those skilled in the art. Any distribution is possible and is selected by those, skilled in the art, according to requirements.

What is claimed is:

1. A machine table for a processing machine for holding at least one workpiece to be processed or at least one work accessory, comprising:

at least one table element mounted for rotation about an axis, each of said at least one table element having at least two sides, each of said at least two sides being movable into a working position upon rotation of said table element, and an attachable element connectable to a respective one of said at least two sides of said at least one table element, said attachable element comprising acting means for holding at least one of the workpiece and work accessory.

2. The machine table of claim 1, wherein said at least one table element is constructed as a table top having a large area.

3. The machine table of claim 1, wherein said at least one table element comprises a plurality of table elements, each of said table elements being constructed in the form of a console, further comprising a table frame, said table elements being rotatably mounted to said table frame.

4. The machine table of claim 3, wherein each of said table elements has a triangular cross section and thus three sides.

5. The machine table of claim 3, wherein each of said table elements has a quadrilateral cross section and thus four sides.

6. The machine table of claim 3, wherein said table elements are mounted displaceably on said table frame.

7. The machine table of claim 6, wherein said table elements are displaceable next to one another to thereby form a flat, closed tabletop.

8. The machine fable of claim 7, wherein said table elements are displaceable at least one of manually and automatically.

9. The machine table of claim 7, further comprising a respective motor coupled to each of said table elements for automatically rotating said table element.

10. The machine table of claim 1, wherein each of said at least one table element is rotatable at least one of manually and automatically.

11. The machine table of claim 10, wherein said at least one table element comprises a plurality of table elements, said table elements being rotatable jointly by one of a common motor drive and pneumatic drive.

12. The machine table of claim 10, wherein said at least one table element comprises a plurality of table elements, said table elements being rotatable separately by one of separate motor drives and pneumatic drives.

13. The machine table of claim 1, wherein said acting means comprise a grid-groove structure formed in said attachable element.

14. The machine table of claim 1, wherein said acting means comprise a groove structure formed in said attachable element, said groove structure being adapted to receive corresponding counterpieces capable of holding at least one of the workpiece and the work accessory.

15. The machine table of claim 14, wherein said groove structure comprises T-shaped grooves.

16. The machine table of claim 1, wherein said attachable element comprises longitudinally extending rails and at least one carriage engaging with and movable on said rails.

17. The machine table of claim 1, wherein said attachable element comprises a plurality of suction openings, said acting means further comprising valve elements engaging with said suction openings to selectively close and open said suction openings.

18. The machine table of claim 1, wherein said attachable element comprises a magnetic plate.

19. The machine table of claim 1, wherein said attachable element comprises a metal plate having a plurality of channel openings opening at an upper side of said plate, said acting means further comprising magnetic closing disks engaging with said channel openings.

20. The machine table of claim 1, wherein said attachable element comprises a wood or plastic plate into which nails, screws and other fastening elements can be introduced.

21. The machine table of claim 1, wherein said attachable element is a plate, said further comprising fastening means for fastening said plate to the respective on& of said at least two sides of said at least one table element.

22. The machine table of claim 1, wherein said at least one table element includes at least one vacuum channel for enabling a vacuum force to be operative on at least one side of said at least one table element.

23. The machine table of claim 22, wherein said acting means comprise channel boreholes formed in said at least one table element, a vacuum channel in flow communication with said channel boreholes and channel boreholes formed in said attachable element, at least a portion of said channel boreholes in said attachable element being alignment with said channel boreholes formed in said at least one table element.

24. The machine table of claim 22, wherein said at least one table element includes a vacuum channel arranged on one side and connectable to an external source of vacuum only in and automatically upon reaching a position in which the respective side is in a working position.

25. The machine table of claim 1, wherein said at least one table element includes at least one vacuum channel and a channel borehole in flow communication with each of said at least one vacuum channel, said channel borehole opening at the respective side of said at least one table element.

26. The machine table of claim 1, further comprising at least one locking element for locking said at least one table element in a working position.

27. The machine table of claim 26, wherein said at least one locking element is structured and arranged to connect a vacuum channel in said at least one table element with a vacuum source connectable to said at least one locking element.

28. The machine table of claim 1, wherein said at least one table element comprises an integrated compressed air channel opening at least at one side of said at least one table element and connectable to an external source of compressed air.

29. The machine table of claim 1, further comprising at least one fluid-conveying channel, a plate arranged at a front side of said at least one table element to close off said at least one channel and means for connecting said at least one channel to one of a vacuum and compressed air source.

30. The machine table of claim 1, wherein said at least one table element has a basic support including at least one integrated channel, said plate being attachable to said basic support.

31. The machine table of claim 1, wherein said at least one table element comprises a plurality of table element sections arranged in series, each of said table element sections having at least two sides being rotatable separately about a common axis, said table element sections being lockable to one another.

32. The machine table of claim 31, wherein said table element sections are rotatable at least one of manually and mechanically.

33. The machine table of claim 31, wherein each of said table element sections has at least one fluid-conveying channel in an upper working position, said table element sections being structured and arranged to enable coupling of said at least one channel of adjacent ones of said table element sections to one another.

34. The machine table of claim 30, wherein each of said adjacent table element sections has at least one channel not in the upper working position, said adjacent table element sections being structured and arranged to enable coupling of said at least one channel of said adjacent table elements not in the upper working position to one another.

35. The machine table of claim 30, wherein the coupling is accomplished automatically upon reaching a position in which the sides of said adjacent table element sections are parallel to one another.

36. The machine table of claim 31, wherein at least one of said table element sections is removable from said at least one table element.

37. The machine table of claim 36, further comprising a central support extending in an axis of rotation of said at least one table element, said table element sections being detachably positionable on said central support.

38. The machine table of claim 36, wherein at least one of said table element sections is removable completely from said at least one table element such that a gap is formed between two table elements sections.

39. The machine table of claim 1, wherein said acting means are arranged to engage the workpiece.

40. The machine table of claim 1, wherein said acting means are arranged to engage the work accessory.

41. The machine table of claim 1, wherein said acting means are arranged to interact with the workpiece.

42. The machine table of claim 1, wherein said acting means on all of said at least two sides of said at least one table element are the same.

43. The machine table of claim 1, wherein said acting means on said at least two sides of said at least one table element are different from one another.

44. The machine table of claim 1, wherein said attachable element forms said acting means.

45. A machine table for a processing machine for holding at least one workpiece to be processed or at least one work accessory, comprising:

at least one table element mounted for rotation about an axis, each of said at least one table element having at least two sides, each of said at least two sides being movable into a working position upon rotation of said table element, said at least one table element including at least one vacuum channel arranged on each of said sides of said at least one table element for enabling a vacuum force to be operative on each of said sides of said at least one table element.

46. The machine table of claim 45, wherein said at least one table element further comprises channel boreholes on each of said sides in flow communication with one of said vacuum channels.

47. The machine table of claim 46, wherein each of said vacuum and respective one of said channel boreholes forms a T-shaped groove in the respective side of said at least one table element.

48. A machine table for a processing machine for holding at least one. workpiece to be processed or at least one work accessory, comprising:

at least one table element mounted for rotation about an axis, each of said at least one table element having at least two sides, each of said at least two sides being movable into a working position upon rotation of said table element, said at least one table element including a vacuum channel, and at least one locking element for locking said at least one table element in a working position, said at least one locking element being structured and arranged to connect said vacuum channel in said at least one table element with a vacuum source.

49. The machine table of claim 48, wherein said at least one locking element includes an opening adapted to mate with a pipeline from the vacuum source.

50. The machine table of claim 48, wherein said at least one locking element comprises a latching element arranged to latch in a recess of said at least one table element.

51. The machine table of claim 50, wherein said at least one locking element comprises a compression spring arranged to bias said latching element toward said at least one table element.

52. The machine table of claim 50, wherein said at least one table element comprises a plate with a plurality of recesses adapted to be latched with said latching element whereby only when said latching element is situated in a recess is said vacuum channel is in flow communication with the vacuum source.

53. A machine table for a processing machine for holding at least one workpiece to be processed or at least one work accessory, comprising:

at least one table element mounted for rotation about an axis, each of said at least one table element having at least two sides, each of said at least two sides being movable into a working position upon rotation of said table element, clamping means arranged on each side of said at least one table element for holding at least one of the workpiece and work accessory, said, clamping means being formed directly at the respective side of said at least one table element.

54. The machine table of claim 53, wherein said clamping on all of said at least two sides of said at least one table element are the same.

55. The machine table of claim 53, wherein said clamping means on said at least two sides of said at least one table element are different from one another.

56. A machine table for a processing machine for holding at least one workpiece to be processed or at least one work accessory, comprising:

at least one table element mounted for rotation about an axis, each of said at least one table element having at least two sides, each of said at least two sides being movable into a working position upon rotation of said table element, clamping means arranged on each side of said at least one table element for holding at least one of the. workpiece and work accessory, said clamping means being integrated into the respective side of said at least one table element.

57. The machine table of claim 56, wherein said clamping on all of said at least two sides of said at least one table element are the same.

58. The machine table of claim 56, wherein said clamping means on said at least two sides of said at least one table element are different from one another.

* * * * *